(12) United States Patent
Gaus

(10) Patent No.: US 11,814,319 B2
(45) Date of Patent: Nov. 14, 2023

(54) PRODUCTION OF FOAMED SAND USING NEAR INFRARED

(71) Applicant: ThermProTEC GmbH, Kehl-Marlen (DE)

(72) Inventor: Rainer Gaus, Freiburg im Breisgau (DE)

(73) Assignee: ThermProTEC GmbH, Kehl-Marlen (DE)

( * ) Notice: Subject to any disclaimer, the term of this patent is extended or adjusted under 35 U.S.C. 154(b) by 766 days.

(21) Appl. No.: 16/641,319

(22) PCT Filed: Aug. 24, 2018

(86) PCT No.: PCT/DE2018/100731
§ 371 (c)(1),
(2) Date: Feb. 24, 2020

(87) PCT Pub. No.: WO2019/037819
PCT Pub. Date: Feb. 28, 2019

(65) Prior Publication Data
US 2020/0277228 A1   Sep. 3, 2020

(30) Foreign Application Priority Data
Aug. 24, 2017   (DE) .......................... 102017119371.5

(51) Int. Cl.
C04B 20/06 (2006.01)
B01D 45/16 (2006.01)
B01J 19/12 (2006.01)
C04B 14/06 (2006.01)
C04B 20/00 (2006.01)
C04B 38/00 (2006.01)

(52) U.S. Cl.
CPC ............ *C04B 20/066* (2013.01); *B01D 45/16* (2013.01); *B01J 19/128* (2013.01); *C04B 14/06* (2013.01); *C04B 20/002* (2013.01); *C04B 38/0093* (2013.01); *B01J 2219/0801* (2013.01); *B01J 2219/0869* (2013.01); *B01J 2219/0879* (2013.01)

(58) Field of Classification Search
None
See application file for complete search history.

(56) References Cited

U.S. PATENT DOCUMENTS 4,016,229 A * 4/1977 Tobin .................... C04B 18/082
501/80
4,401,586 A * 8/1983 Ghiringhelli ........... C04B 20/06
252/378 R (Continued)

FOREIGN PATENT DOCUMENTS

WO      8300858     3/1983
WO    2013053635    4/2013

*Primary Examiner* — John J Figueroa
(74) *Attorney, Agent, or Firm* — Volpe Koenig

(57) ABSTRACT

A method for producing a bulk material consisting substantially of foamed or blown mineral or oxide particles by thermal treatment of a bulk material of basic particles, characterized in that the thermal treatment includes transport of a transversely conveyed or horizontal layer or of a free flow of the bulk material through a radiation field, the substantial active component of which lies in the near infrared range (NIR), and which has a power density of at least 50 kW/m2.

16 Claims, 1 Drawing Sheet

(56) References Cited

U.S. PATENT DOCUMENTS

| | | | | |
|---|---|---|---|---|
| 4,505,866 A | * | 3/1985 | Oguri | C04B 35/10 |
| | | | | 423/628 |
| 5,219,802 A | * | 6/1993 | Hsiao | C04B 33/13 |
| | | | | 501/81 |
| 11,358,310 B2 | * | 6/2022 | Romanov | B29C 44/58 |
| 2005/0281730 A1 | * | 12/2005 | Theriault | C04B 38/0054 |
| | | | | 264/29.7 |
| 2007/0158877 A1 | * | 7/2007 | Rajner | B22F 3/1216 |
| | | | | 264/415 |
| 2014/0291582 A1 | | 10/2014 | Brunnmair | |

* cited by examiner

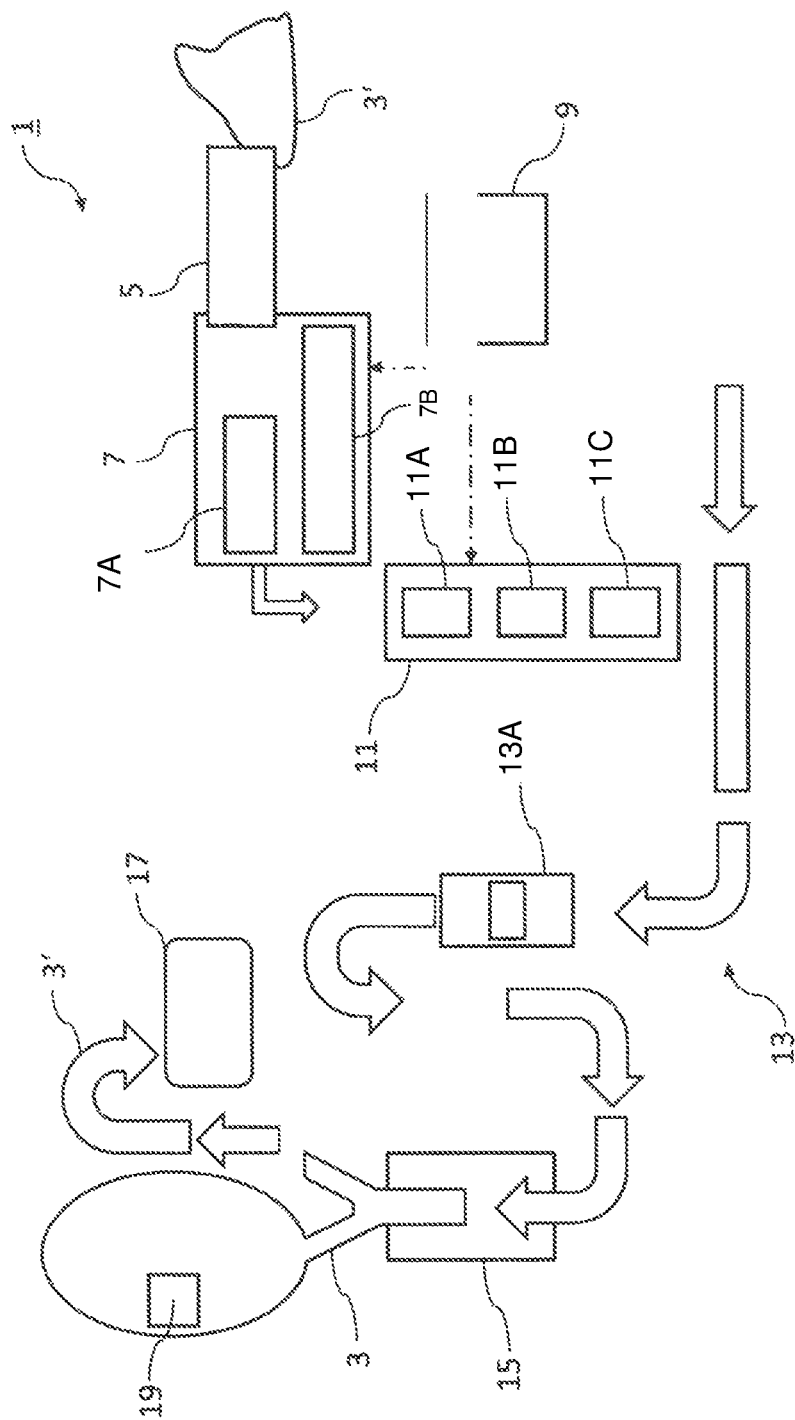

PRODUCTION OF FOAMED SAND USING NEAR INFRARED

BACKGROUND

The invention relates to a method for producing a bulk material essentially from foamed or blown mineral or oxidic particles by thermal treatment of a bulk material of basic particles and an arrangement for carrying out this process.

In the context of global efforts to protect the climate, there is a continuously high and increasing demand for cost-effective insulating materials with a wide range of applications. In view of the fact that certain insulation materials used on a large scale (e.g. polystyrene-based) have to be substituted in certain areas of application due to problems with fire protection and environmentally sound disposal, there is a particular need for substitute materials that can be widely used in the construction industry.

In recent years, there have therefore been developments to extract a bulk material from certain sands by thermal treatment from particles with air inclusions and, as a result, very good thermal insulation properties, which is sometimes referred to as "expanded sand". In addition to their extremely low thermal conductivity, these expanded sands have a high temperature resistance and low heat capacity and can be processed with known binders to produce a variety of products that can be widely used in the construction industry, such as insulating plasters, insulating fillers for construction elements (e.g. bricks), fire protection cladding, quick-drying screeds, etc.

Such expanded sands are now commercially available. They are produced with "open flame", which leads, among other things, to an unsatisfactory yield of usable end product and relatively high costs for the separation of unusable parts of the immediate process product.

SUMMARY

The invention is therefore based on the object of specifying an improved method for the production of such bulk materials and an arrangement suitable for carrying out this process.

This object is met in its method aspect by a method with one or more features described herein and in its device aspect by an arrangement with one or more features as described herein. Appropriate further developments of the inventive idea are described below and in the claims.

The invention includes the idea of exposing the starting product, i.e. a bulk of mineral or oxidic basic particles, to a thermal treatment with short-wave infrared radiation, especially radiation in the near infrared range (with a wavelength of about 0.8 to 1.5 µm) in order to achieve the desired swelling or foaming of the basic particles. Furthermore, the invention includes the idea of allowing the said short-wave infrared radiation (NIR radiation) to act on a layer transported through a radiation field or a trickle stream of the basic particles, i.e. to provide for continuous process control. In addition, the invention includes the idea of using a NIR radiation field with high power density in the interest of high efficiency of expansion/foaming and high throughput. This should typically be at least above 50 kW/m², preferably even much higher.

In a practically relevant embodiment of the method, the basic particles are a sand with a high water glass content, especially with a grain size in the range of 50-500 µm and a water glass content of at least 40%.

Such sands are a widely available and very cost-effective starting product, and their processing is unproblematic from an environmental and occupational safety point of view.

As a result of the method, a bulk material is then preferably obtained from foamed or blown sand particles, which at the end of the thermal treatment, without a separation step, comprises a proportion of 60%, in particular 80%, perlite particles with an essentially closed surface and/or in which the particle size is in the range of 0.3 mm-2 mm. Such a method product is particularly well suited for use in various products with high insulating properties and is also particularly cost-effective because a large proportion of the starting product is converted into a usable end product.

In a preferred embodiment, an infrared radiator array with a radiation temperature of 2900 K or more, preferably 3200 K or more, is used for the proposed drying process. According to the inventors' findings, its radiation spectrum is particularly suitable for the thermal dewatering of bulk material, especially of powdery or fluttery consistency.

The use of an arrangement with several halogen lamps with corresponding radiator temperature is also preferred, whose radiation is concentrated or focused on the passing flow of the source material to be treated by assigned reflection surfaces. In a preferred embodiment, additional reflectors or reflection surfaces are provided on the side of the product stream facing away from the radiation source(s). These reflectors or reflection surfaces deflect a part of the NIR radiation not absorbed by the product stream during the first pass back into the product stream. This further increases the radiation yield and thus the energy efficiency of the treatment process.

Even more preferred is such a design of the plant that the irradiation area forms a largely closed radiation chamber, which is only open to the extent required for the transport of the product stream.

Depending on the specific chemical composition and the moisture content of the bulk material, a period of time in the range between 0.5 and 20 s, in particular between 1 and 5 s, is provided for treatment with NIR radiation. The duration of time is adjusted by the length of the NIR radiation field and the transport speed of the conveyor system when the starting material is conveyed horizontally or at an angle. If the NIR irradiation takes place in a trickle stream, the dwell time in the radiation field can be adjusted appropriately by the air velocity of an air stream directed against the trickle stream.

In the core area of thermal treatment, the maximum temperature of the bulk material is preferably set in the range between 600 and 1500° C., especially 800 to 1200° C.

The power density of the NIR radiation is preferably adjusted to values above 300 kW/m², especially to more than 500 kW/m², in order to achieve a short treatment duration.

Its layer thickness of the starting material in the radiation field is preferably set to a value between 2 mm and 30 mm, even more specifically between 5 mm and 20 mm.

In another embodiment, the bulk material is transported through an NIR radiation field with several heating areas with different power densities. This allows, if necessary in view of the properties of the starting product and the desired properties of the end product, targeted preheating and/or temperature equalization in addition to a main heating step. This is also possible in a further embodiment in which at least one further thermal treatment step is carried out in addition to the transport through the radiation field with NIR radiation.

The latter embodiment may be specially designed so that the layer of the bed of basic particles, in particular on a vibrating table or inclined conveyor, is transported horizontally or at an angle through the radiation field with near infrared radiation and is thereby thermally pre-treated and the thermally pre-treated bed is then subjected to post-treatment in an induction furnace or a second radiation field with infrared radiation. The infrared radiation of the second radiation field does not necessarily have to be NIR radiation, but a conventional industrial furnace with long-wave IR radiation or resistance heating can also be used.

In a further embodiment, the subsequent treatment step is carried out in a, in particular vertical, multi-zone furnace, whose heating zones have increasing temperatures from the inlet to the outlet. Even more specifically, the temperature of the first heating zone can be set in the range between 950 and 1050° C., the temperature in a second heating zone in the range between 1050° C. and 1150° C. and the temperature in a third heating zone in the range between 1150° C. and 1250° C.

In a further embodiment, after the thermal treatment, a rapid cooling of the bulk material is carried out, in particular by letting it impinge on an actively cooled cooling surface.

In a practically relevant embodiment, the method further comprises a separation step of separating the foamed or blown particles from non-foamed or non-blown basic particles on the basis of their different specific weight, in particular in a cyclone separator or in a rising air stream. It appears to be particularly efficient if the separation step is carried out together with the thermal treatment or a thermal treatment step or a cooling step in one and the same part of the plant, especially in the rising air flow in a vertical furnace or cooler.

Device aspects of the present invention arise for the person skilled in the art largely from the method aspects explained above, so that in this respect repetitions are avoided. However, reference is made to some embodiments of the proposed arrangement.

In one embodiment, the NIR radiation field has several heating areas with separate control, especially for setting different power densities. Alternatively or additionally, the arrangement may include a multi-zone furnace with an inductive or infrared heating system, which is arranged downstream of the NIR radiation field, especially in the transport direction of the bulk material, and/or in particular is oriented vertically.

In a further embodiment, the transport device has a vibrating table, belt conveyor or drum conveyor, wherein in the case of a drum conveyor, the flat arrangement of NIR halogen emitters is curved to match a peripheral surface of the drum conveyor.

In a further embodiment, the arrangement includes a cooling device for rapid cooling of the thermally treated bulk material, which in particular comprises an actively cooled cooling surface on which the bulk material impinges.

Another embodiment has a separating device for separating the foamed or blown particles from non-foamed or non-blown basic particles due to their different specific weight, in particular a cyclone separator or a fan for generating a rising air flow.

In the interest of a simultaneously cost-effective and compact design of the plant, an embodiment is of interest in which the vertical multi-zone furnace and the fan for generating an ascending air flow are structurally combined in such a way that the separation step is carried out in conjunction with a thermal treatment step in the multi-zone furnace or a cooling step.

BRIEF DESCRIPTION OF THE DRAWINGS

The advantages and usefulness of the invention are further described in the following embodiment example by reference to the FIGURE.

The sole FIGURE is a diagrammatic representation of a production line for the production of foamed sand.

DETAILED DESCRIPTION

The FIGURE shows a synoptic representation of a production line 1 for the production of foamed sand as a thermally treated bulk material 3 made of normal sand 3' containing water glass as starting material.

A screw conveyor 5 conveys the sand 3' into an NIR treatment station 7, in which an NIR emitter module 7a is arranged above an oscillating conveyor 7b and NIR irradiation of the starting material continuously conveyed through the irradiation station 7 is carried out with predetermined power density and dwell time. The setting of the power density and the dwell time (via the conveying speed of the oscillating conveyor 7b) is controlled by a process control unit 9 After leaving the NIR treatment station 7, the pre-treated material enters a vertical furnace 11 with inductive heating, which comprises three heating zones 11a, 11b, 11c with independently adjustable temperature and in which the thermal treatment of the sand is completed. Also the treatment in vertical furnace 11 and especially the temperatures in the heating zones 11a-11c are controlled by the process control unit 9.

The thermally blown or foamed sand is cooled in a cooling system 13, which includes (not shown) cooling air fans and a cooling pipe 13a. It is then fed to a cyclone separator 15, where the non-blown product fraction 3' is separated from the final product 3 with the desired properties. While the thermally unmodified starting product 3' enters a storage container 17 from where it can be brought back to the starting point of the process, the cleaned end product is blown into a fabric bag 19.

The execution of the invention is not limited to this example, but is also possible in a variety of modifications, which are within the scope of professional action.

The invention claimed is:

1. A method for producing a bulk material essentially from foamed or blown mineral or oxidic particles by thermal treatment of a bed of basic particles, the method comprising:
   transporting a transversely conveyed or horizontal layer or a trickle stream of the bed of the basic particles through a radiation field of radiation whose essential active component is in a near infrared, NIR, range having a wavelength in a range between 0.8 μm and 1.5 μm and which has a power density of at least 50 kW/m² for thermally treating the basic particles; and
   adjusting a maximum temperature in the layer or in the trickle stream to a temperature in a range between 600 and 1500° C.

2. The method according to claim 1, wherein the basic particles are a sand with a high water glass content, a grain size in the range of 50-500 μm, and a water glass content of at least 40%.

3. The method according to claim 2, wherein the bulk material of foamed or blown sand particles at an end of the thermal treatment, without a separation step, comprises a proportion of at least 60% of perlite particles with at least one of a substantially closed surface or a particle size is in a range of 0.3 mm-2 mm.

4. The method according to claim 1, further comprising using halogen lamps to generate the NIR radiation field, radiation of which is focused on the layer or trickle stream of the bulk material.

5. The method according to claim 4, further comprising actively irradiating the layer or trickle stream of the bulk material from a main surface and a portion of the radiation passing through is reflected back into the layer or trickle stream.

6. The method according to claim 1, further comprising exposing the layer or trickle stream to the NIR radiation field for a period of time in the range between 0.5 and 20 s.

7. The method according to claim 1, wherein a power density of the NIR radiation field on a surface of the layer or trickle stream is above 300 kW/m$^2$.

8. The method according to claim 1, wherein a layer thickness of the layer or the trickle stream is in range between 2 mm and 30 mm.

9. The method according to claim 1, further comprising transporting the bulk material through the NIR radiation field which includes several heating areas with different power density.

10. The method according to claim 1, further comprising, in addition to the transport through the radiation field with NIR radiation, carrying out at least one further thermal treatment step on the thermally treated basic particles.

11. The method according to claim 10, further comprising transporting the layer of the bed of basic particles horizontally or transversely through the radiation field with near infrared radiation and thereby thermally pretreating the bed of basic particles, and then subjecting the thermally pretreated bed to an after-treatment in an induction furnace or a second radiation field with infrared radiation.

12. The method according to claim 11, wherein the subsequent treatment step is carried out in a multi-zone furnace, the heating zones of which have a temperature which rises from an inlet to an outlet thereof.

13. The method according to claim 12, wherein a temperature of the first heating zone is set in a range between 950 and 1050° C., a temperature in a second heating zone is set in a range between 1050° C. and 1150° C., and a temperature in a third heating zone is set in a range between 1150° C. and 1250° C.

14. The method according to claim 10, further comprising after the thermal treatment, carrying out a rapid cooling of the bulk material.

15. The method according to claim 1, further comprising a separation step of separating the foamed or blown particles from non-foamed or non-blown basic particles based on different specific weight thereof.

16. The method according to claim 15, further comprising carrying out the separation step together with the thermal treatment or a cooling step in one and the same plant part.

\* \* \* \* \*